United States Patent [19]

Ogren

[11] Patent Number: 4,940,274
[45] Date of Patent: Jul. 10, 1990

[54] HOOD GLARE SHIELD

[76] Inventor: Warren Ogren, Rte. 8, Ogren Rd., Hayward, Wis. 54843

[21] Appl. No.: 301,070

[22] Filed: Jan. 25, 1989

[51] Int. Cl.$^5$ .............................................. B60J 3/00
[52] U.S. Cl. ................................................... 296/97.7
[58] Field of Search ..................... 296/97.7, 97.8, 97.1

[56] References Cited

U.S. PATENT DOCUMENTS

| | | | |
|---|---|---|---|
| 2,613,104 | 10/1952 | Parsons | 296/97.7 |
| 3,042,445 | 7/1962 | Lamar | 296/97.7 |
| 4,005,899 | 2/1977 | Rigney | 296/97.7 |
| 2,187,027 | 1/1940 | Harvey | 296/97.7 |
| 2,546,495 | 3/1951 | Bybee | 296/97.7 |
| 2,813,749 | 11/1957 | Wetic | 296/97.7 |
| 3,022,109 | 2/1962 | Hauskama | 296/97.7 |
| 3,804,456 | 4/1974 | Boyle | 296/97.7 |

Primary Examiner—Robert R. Song
Attorney, Agent, or Firm—Palmatier & Sjoquist

[57] ABSTRACT

The present hood glare shield for blocking sun or headlight glare reflecting from the hood of a vehicle includes a panel slidable transversely in a resilient base affixed to the dashboard of the vehicle. The base includes a pair of resilient guides for readily inserting the panel in the base such as when the vehicle is suddenly turned into the sun or when the bright high beam headlights of an oncoming vehicle are ungraciously switched on. The base further includes a pair of resilient upright clamps for maintaining the panel in an upright position regardless of the angle at which the panel is inserted into the base.

14 Claims, 2 Drawing Sheets

HOOD GLARE SHIELD

The present invention relates to sun or headlight glare shields and, more particularly, to sun or headlight glare shields mountable on the dashboard in a vehicle such as a car or truck.

BACKGROUND OF THE INVENTION

One cause of automobile accidents is blinding sun glare. The glare reflects from the hood of a vehicle and is most often encountered when the sun is low in the horizon and one is driving toward the sun, such as when one is driving eastwardly in the morning and westwardly in the evening. Since the lower portion of a conventional windshield is untinted and clear, sun rays of angles of lower incidence remain unshielded as they are reflected into the eyes of a driver. The unshielded and intense sun glare from the hood undoubtedly temporarily blinds a number of drivers on a daily basis and, at the very least, contributes to driver fatigue.

SUMMARY OF THE INVENTION

A feature of the present invention includes the provision in the interior of a vehicle such as a car or truck, of a shield transversely slidable on the dashboard of the vehicle for adjustably blocking blinding sun or headlight glare being reflected from the hood of the vehicle as the position of the car changes relative to the sun or relative to the headlights of an oncoming vehicle.

Another feature of the present invention includes the provision in the interior of a vehicle such as a car or truck, of a shield readily and removably mounted on the dashboard of the vehicle for quickly blocking sun or headlight glare being reflected from the hood of the vehicle as the car is turned into the sun or the bright, high beam headlights of an oncoming vehicle are switched on.

Another feature of the present invention includes the provision in the interior of a vehicle such as a car or truck, of an electrically activated glare shield mountable on the dashboard of the vehicle and becoming opaque when it is electrically charged for blocking glare deflecting from the hood of the vehicle.

An advantage of the present invention is that it blocks glare deflecting from the hood of a vehicle and thereby enhances the vision of a driver, eliminates temporary blindness of the driver, and reduces driver fatigue.

Another advantage of the present invention is that it allows a driver of a vehicle such as a car to adjustably block light glare as the position of the car changes relative to the light source and the light reflects off different surface portions of the hood.

Another advantage of the present invention is that it permits the driver of a vehicle to block sun glare as soon as the vehicle is turned into the sun.

Another advantage of the present invention is that it is inexpensive to manufacture, easy to install, and simple to operate.

Another advantage of the present invention is that it blocks glare produced at night by the headlights of on oncoming vehicle and is adjustable as the relative position of the approaching vehicle changes.

Another advantage of the present invention is that it blocks glare produced at night by unpredictable sources at unpredictable angles of incidence such as bright neon lights and is readily mountable and adjustable to block such glare.

Another advantage of the present invention is that it is visually unobtrusive when mounted on the dashboard of a vehicle and easily stored in the passenger compartment when hood glare is absent.

Another advantage of the present invention is that it is aesthetically appealing and acceptable on even the latest car or truck models and is suitable for both truck and passenger vehicles.

DETAILED DESCRIPTION OF THE PREFERRED EMBODIMENTS

Figure 1:
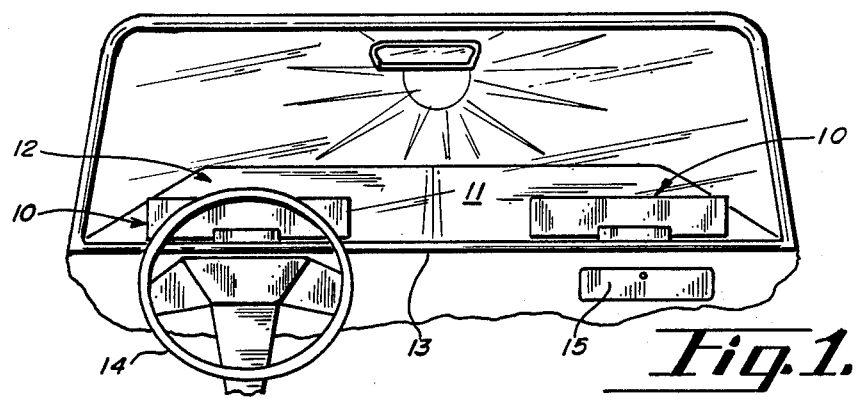
FIG. 1 is a perspective view of the hood glare shield mounted on the dashboard of a vehicle such as a car.

As shown in FIG. 1, the reference numeral 10 generally indicates a hood glare shield for blocking sun glare reflecting off the hood 11 of a vehicle 12. The shield 10 is mountable in the interior of the vehicle 12 such as on or adjacent to a dashboard 13 near the steering wheel 14. A second shield 10 may be mounted on a dashboard 13 on the passenger's side of the vehicle 12 near where a glove compartment 15 is typically disposed.

Figure 2:
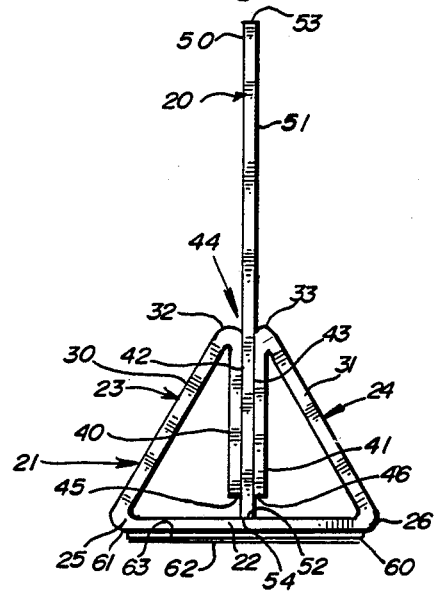
FIG. 2 is an end elevation view of the hood glare shield shown in FIG. 1.
Figure 3:
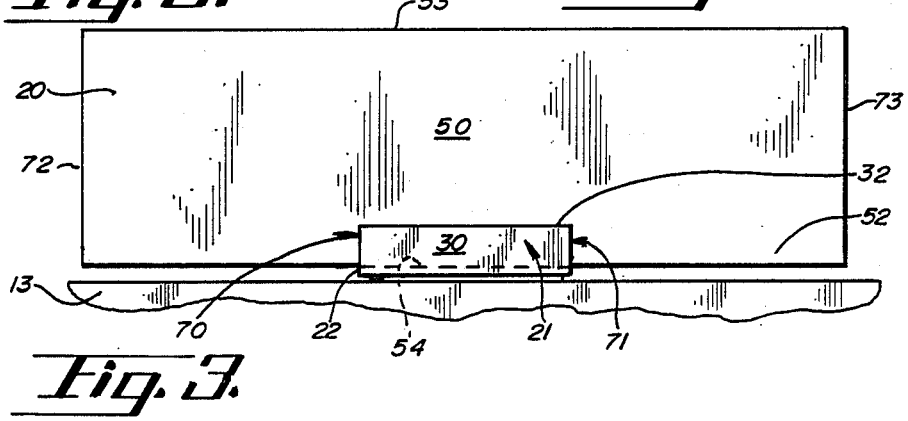
FIG. 3 is a front elevation view of the hood glare shield shown in FIG. 1.

As shown in FIGS. 2 and 3, a hood glare shield typically includes an opaque or intransparent, upright, rectangular like, somewhat rigid panel 20 removably and slidably mounted in a panel receiving and support 21. Although the panel 20 is typically opaque, it may be translucent or optically polarized so as to diffuse or block glare.

The panel support 21 includes a substantially horizontally disposed, elongate floor like base portion 22 and a pair of elongate, bent, opposing, resilient, clamping and orienting jaws or arms or base extensions 23, 24 integrally connected to opposing, respective ends 25, 26 of the base portion 22.

Each of the jaws 23, 24 includes a respective, somewhat flexible, upwardly and inwardly extending, oblique portion 30, 31 integrally connected to and extending from respective ends 25, 26 of the base portion 22. Each of the oblique portions 30, 31 includes a respective inwardly and downwardly curved, somewhat flexible, elongate, upper end guide portion 32, 33 integrally connected to respective oblique portions 30, 31.

Each of the jaws 23, 24 further includes a respective elongate, downwardly extending, opposing, somewhat flexible and resilient panel receiving and holding portion 40, 41 integrally connected to and extending downwardly from the respective inwardly curved, upper ends 32, 33. Each of the panel holding portions 40, 41 including opposing, panel bearing surfaces 42, 43 for bearing against the panel 20. The panel holding portions 40, 41 form a panel receiving slot 44 for receiving the panel 20. When a panel 20 is absent from the support 21, the panel bearing surfaces 42, 43 bear against one another, closing the slot 44. The downwardly extending portions 40, 41 include respective, lower, distal ends 45, 46 which are spaced from the base portion 22.

The panel 20 includes a pair of opposing elongate faces 50, 51, a bottom edge 52, and a top edge 53. When disposed in the support 21, the bottom edge of the panel 20 bears against a medial portion of an upper surface 54 of the base portion 22. The panel 20 is of sufficient height to block sun glare yet allow a sufficient range of vision for the driver over the top edge 53 of the panel 20.

A connection means or tape 60 is affixed to an underside 61 of the base portion 22. The tape 60 is typically of the double stick variety and has a removable strip 62. When the strip 62 is removed, a dashboard connecting surface 63 is exposed.

As shown in FIGS. 2 and 3, the support 21 includes a first open end 70 and a second open end 71. Panel 20 includes a first vertical edge 72 and a second vertical edge 73.

It should be noted that the support 21 and panel 20 are typically formed from extruded plastic in a heat process. However, the support 21 and panel 20 may be formed from other materials such as cardboard or metal or wood.

It should further be noted that the panel 20 is typically approximately fifteen to twenty inches in length, two to six inches in height and 1/64 to ⅛ inches in thickness. The support 21 is typically approximately two inches to ten inches in length, one-half inch to two inches in height, and one-half inch to two inches in thickness across the floor-like portion 22.

In operation, the strip 62 is removed from the support 21, which is then connected to the dashboard 13 or a like portion of the interior of a vehicle such as a car. The support 21 is typically aligned with the driver's line of sight over the steering wheel 14.

After the support 21 is connected, the elongate, removable panel 20 is stored in the interior of the vehicle 12, such as in a flat disposition on the dashboard 13 with one of its faces 50, 51 disposed thereupon. When the car or truck 12 is turned into the sun, the driver of the vehicle 12 inserts the bottom edge 52 into the support 21. As the bottom edge 52 approaches the support 21, the inwardly curved portions 32, 33 guide the bottom edge 52 into the panel receiving slot 44 and between the downwardly extending resilient, panel holding portions 40, 41, which are thereby separated. As the panel 20 is being inserted between the downwardly extending, resilient, panel holding portions 40, 41, the portions 40, 41 resiliently bend outwardly or inwardly if the panel 20 is inserted at an angle, which is foreseeable if the driver is fighting sun glare reflecting off the hood 11. After the bottom edge 52 bears against the upper surface 54 of the base portion 22 and the driver has released the panel 20, the resilient panel holding portions 40, 41 return to their operating upright positions so as to dispose the panel 20 in a substantially upright orientation. Alternatively, the insertion of the panel 20 into the support 21 may be accomplished by sliding edge 72 of the panel 20 into open end 71 of the support 21 and transversely through the support 21.

When the panel 20 is disposed in the support 21, the panel 20 may be moved by a sliding motion transversely in slot 44 of the support 21 as the position of the sun changes relative to the vehicle 12. Even where, for example, edge 72 of the panel 20 is between ends 70, 71 of the support 21 or within an inch of end 71 of the base 21, the support 21 sufficiently holds the panel 20 in an operating, upright position.

To remove the panel 20 from the support 21, the panel 20 is either transversely slid out of the slot 44 or removed vertically therefrom or a combination thereof.

Figure 4:
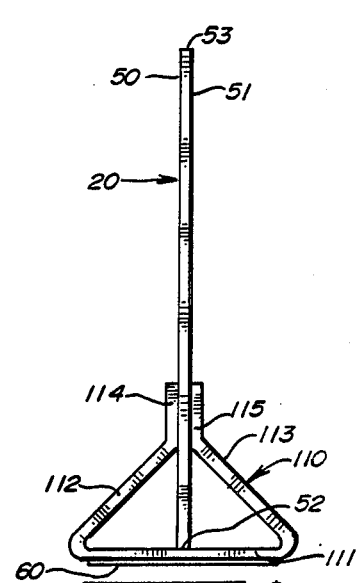
FIG. 4 is an end elevation view of one of the alternate embodiments of the hood glare shield.

As shown in FIG. 4, an alternate embodiment includes a hood glare shield holding face 110 having a floor like portion and a pair of upwardly and inwardly extending resilient jaws 112, 113 integrally connected to and extending upwardly and inwardly from opposing ends of the floor like portion 111. Each of the jaws 112, 113 include a respective upper, integral, upright, resilient clamping ends 114, 115. The clamping ends 114, 115 bear against one another when the panel 20 is absent, and separate from each other and bring pressure to bear on the panel 20 to hold the panel 20 in the base 110. The base 110 includes a connection means 60.

Figure 5:
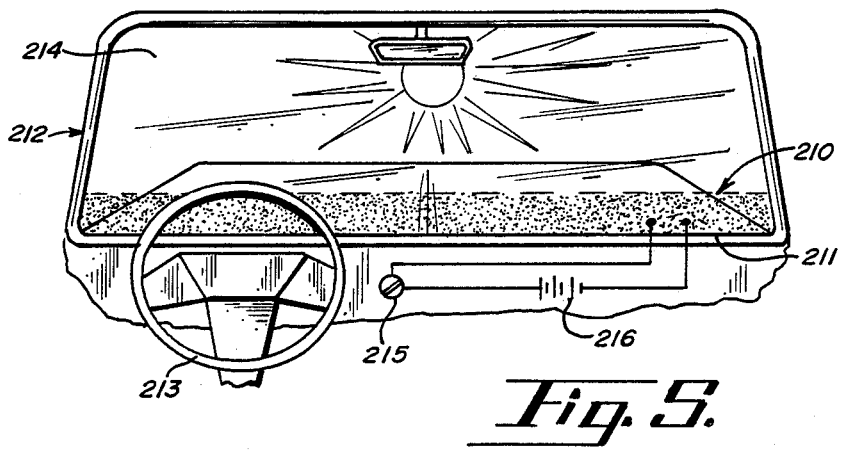
FIG. 5 is a front elevation, partially schematic view of another of the alternate embodiments of the hood glare shield.

As shown in FIG. 5, an electrically activated hood glare shield or strip 210 is disposed near a dashboard 211 of a vehicle 212 with a steering wheel 213 and is typically integral with and incorporated into a windshield 214. The shield 210 is formed of conventional windshield glass containing an electrically activated chemical. The normally transparent shield 210 is darkened so as to be translucent or is rendered opaque and impenetrable by light by an electrical current passing therethrough or partially therethrough to activate the conventional chemical. A switch 215 for controlling the electrically activated shield 210 is typically connected near the steering wheel 213 and coupled to the power source 216 of the vehicle 212. The shield 210 may be disposed transversely across the entire windshield 214.

The present invention may be embodied in other specific forms without departing from the spirit or essential attributes thereof. Therefore, the present embodiments should be considered in all respects as illustrative and not restrictive, reference being made to the appended claims rather than to the foregoing description to indicate the scope of the invention.

I claim:

1. A hood glare shield mountable in the interior of a vehicle such as on the dashboard of a car, comprising
   a panel,
   a base mountable on the dashboard of such a vehicle,
   a pair of jaws connected to the base, one of the jaws orienting the panel in an upright and transverse position, another of the jaws resiliently clamping the panel to the orienting jaw, the panel being removably disposed between the orienting jaw and the clamping jaw and transversely slidable therebetween so that the panel is adjustable from side to side as the position of a light source changes relative to the vehicle whereby the hood glare shield blocks glare from the light source reflecting off the hood of the vehicle.

2. The hood glare shield of claim 1, wherein of the jaws includes a curved portion for guiding the panel between the jaws.

3. The hood glare shield of claim 1, wherein the orienting jaw is elongate.

4. The hood glare shield of claim 1, wherein the orienting jaw is integrally connected to the base.

5. The hood glare shield of claim 1, wherein the clamping jaw is elongate.

6. The hood glare shield of claim 5, wherein the clamping jaw is integrally connected to the base.

7. The hood glare shield of claim 1, wherein one of the jaw includes a resilient oblique portion integrally connected to and extending obliquely from the base, a resilient curved guide portion integrally connected to the oblique portion for guiding the panel between the guide and oblique portions and the base, and a resilient upright portion integrally connected to the guide portion and extending from the guide portion downwardly toward the base, the upright portion maintaining the panel in an upright position relative to the base.

8. The hood glare shield of claim 1, wherein one of the jaws includes a resilient oblique portion integrally connected to and extending obliquely from the base, and an upright portion integrally connected to and extending upwardly from the oblique portion, the upright portion maintaining the panel in an upright position relative to the base.

9. The hood glare shield of claim 1, wherein the panel is opaque.

10. The hood glare shield of claim 1, wherein the panel is translucent.

11. The hood glare shield of claim !, wherein the panel is polarized.

12. The hood glare shield of claim 1, wherein the base is elongate.

13. A hood glare shield mountable in the interior of a vehicle such as on the dashboard of a vehicle of a car, comprising
   a panel,
   a base mountable on the dashboard of such a vehicle, and
   a pair elongate resilient members connected to the base and being resiliently movable toward and away from each other, the resilient members resiliently clamping the panel, the panel being removably disposed between the resilient members and transversely slidable therebetween so that the panel blocks hood glare and is adjustable from side to side as the position of a light source changes relative to the vehicle whereby the hood glare shield blocks glare from the light source reflecting off the hood of the vehicle.

14. A hood glare shield mountable in the interior of a vehicle such as on the dashboard of a car, comprising
   a panel of a generally rectangular shape,
   an elongate floor like portion mountable on the dashboard of such a vehicle and having upper and lower surfaces and opposing edges, a connection means affixed to the lower surface for mounting the floor like portion on the dashboard of such a vehicle,
   a pair of elongate opposing resilient oblique portions integrally connected to and extending inwardly and upwardly from the floor like portion, each of the oblique portions connected to one of the opposing edges of the floor like portion, the oblique portions extending toward one another, the oblique resilient members being resiliently movable toward and away from one another,
   a pair of elongate opposing resilient curved guide portions integrally connected to the oblique portions, each of the guide portions connected to one of the oblique portions, the guide portions extending inwardly and downwardly from the oblique portions, the guide portions being resiliently movable toward and away from one another, and
   a pair of elongate resilient downwardly extending upright portions integrally connected to the guide portions and having lower distal ends, each of the upright portions connected to one of the guide portions, the upright portions extending downwardly from the guide portions and disposed substantially upright relative to the floor like portion, the distal ends being spaced from the floor like portion, the upright portions movable toward and away from one another, the upright portions having a rest position wherein they bear against each other and an operating position wherein they are resiliently separated from one another by the panel, the panel being insertable between the upright portions and against the floor like portion, the panel being resiliently clamped between the upright portions and transversely slidable therebetween so that the panel blocks hood glare and is slidable from side to side so as to be adjustable as the position of a light source changes relative to the vehicle whereby the hood glare shield blocks glare from a light source reflecting off the hood of the vehicle.

\* \* \* \* \*